Figure 1:
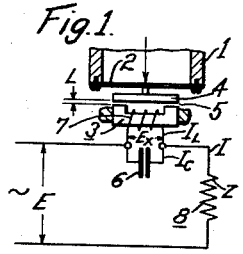

Oct. 24, 1944.  T. E. BROWNE, JR  2,361,173

STRAIN MEASURING SYSTEM

Filed March 24, 1943

WITNESSES:
Wm. B. Sellers.
E. F. Oberheim

INVENTOR
Thomas E. Browne, Jr.
BY Paul E. Friedemann
ATTORNEY

Patented Oct. 24, 1944

2,361,173

UNITED STATES PATENT OFFICE

2,361,173

STRAIN MEASURING SYSTEM

Thomas E. Browne, Jr., Wilkinsburg, Pa., assignor to Westinghouse Electric & Manufacturing Company, East Pittsburgh, Pa., a corporation of Pennsylvania Application March 24, 1943, Serial No. 480,325

15 Claims. (Cl. 177—351)

The present invention relates generally to strain measuring systems and more particularly to systems of the character employing electromagnetic devices for detecting the stress or deflection to be measured.

Electromagnetic devices or reactors have been widely used in the past for detecting the deflections of a member subjected to a stress. However, because of the non-linear response of such devices when used singly in a strain measuring system and other non-linear characteristics of the measuring system associated with the reactor, the practice has been to use two or more reactors with their coils arranged in the legs of a bridge circuit so that the non-linearities of corresponding pairs of the reactors will cancel.

In some applications of stress or strain measurement, it has been found that the best mechanical arrangements have made it undesirable or even impossible to employ the usual plurality of reactors arranged in the conventional bridge circuit and in order to obtain the desired proportional stress or strain indication with a single reactor detecting the stress or strain, some arrangement whereby the above-mentioned non-linearities may be corrected must be provided. Such correction means may be conveniently provided in the measuring system.

In order to understand the present invention more completely, an understanding of the specific characteristics which must be corrected should be had.

Electromagnetic devices or reactors of the character referred to usually comprise a generally U-shaped or E-shaped magnetic core member, a portion of which is disposed within a magnetizing coil. An armature member bridging the extremities of the core member in close proximity thereto is provided to vary the reluctance of the magnetic circuit. Thus the reactance or impedance of the coil linking the magnetic circuit is caused to be varied by armature displacement. However, such an impedance change is not linearly proportional to the armature displacement primarily because the leakage flux at the airgaps, formed between the core extremities and the armature, increases with an increasing airgap and as a result variations in rate of response to the armature movement are introduced into the metering system adapted to measure the varying output of the coil.

If the impedance of the metering or recording device in circuit with the magnetizing coil were zero and could be neglected, the current flowing in the metering system would vary in a linear manner with the reciprocal of the impedance, or admittance, of the coil. Since, however, the impedance of the metering device is of some finite value, the current flowing in the metering system will no longer have a linear relation with the admittance of the magnetizing coil. The nonlinearities thus existing in a system employing but a single reactor as the deflection detecting element are additive and the resulting indication by the metering device does not have simple proportionality to the armature displacement, thus requiring that the readings of a linear metering device, such as an oscillograph galvanometer, be interpreted by means of a calibration curve rather than by a simple proportionality constant.

Accordingly, it is a principal object of the present invention to provide a stress or deflection measuring system employing but a single electromagnetic device or reactor as the deflection detecting element which linearly indicates the deflections to be measured over the whole of a predetermined working range of deflections.

An ancillary object of the present invention is to provide a deflection measuring system of the character referred to in which a current which increases with a decrease in the airgap of the reactor is produced.

Another object of the present invention is to provide a stress or deflection measuring system of the character referred to in which the non-linear response of the reactor to changes in its airgaps and the non-linear variation of current flowing in the measuring system with respect to changes in coil impedance of the reactor are made subtractive and thus, in effect, cancel each other.

A specific object of the present invention is to provide a stress or deflection measuring system of the character referred to in which the coil of the reactor is shunted by a capacitor of such value that the parallel impedance has a leading power factor over the whole of the working range of airgaps of the electro-magnetic device and to further provide a value of impedance in the metering or recording device such that the effect of the non-linear response of the reactor and the effect of the non-linear relation of current in the measuring system to changes in coil impedance are made subtractive and thus in effect cancel each other.

Other objects and advantages will become more apparent from a study of the following specification when considered in conjunction with the accompanying drawing, in which:

Figure 1 diagrammatically illustrates the fundamental principles of the present invention.

Figure 2:
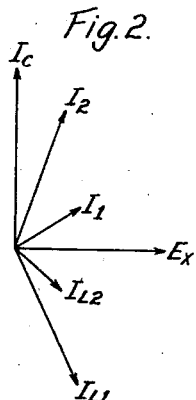

Fig. 2 is a vector diagram illustrating the effects obtained with the fundamental circuit of Fig. 1.

Figure 3:
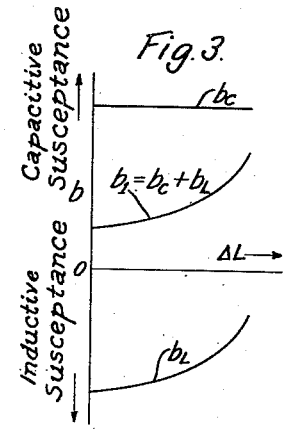

Fig. 3 graphically illustrates the resultant susceptance of the paralleled coil and condenser elements of Fig. 1.

Figure 4:
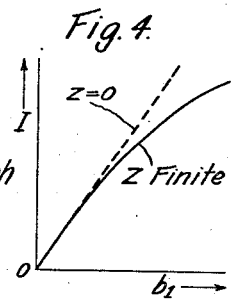

Fig. 4 graphically illustrates the non-linear relation of the current in the metering system to the susceptance of the paralleled coil and condenser combination for given values of impedance of the current responsive element of the metering or recording instrument.

Figure 5:
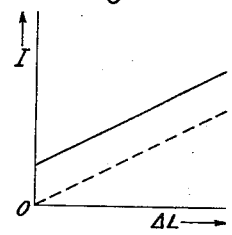

Fig. 5 graphically illustrates the linear relationship of current in the metering circuit to changes in airgap length of the electromagnetic device with a properly selected value of impedance of the current responsive element of the metering or recording instrument.

Figure 6:
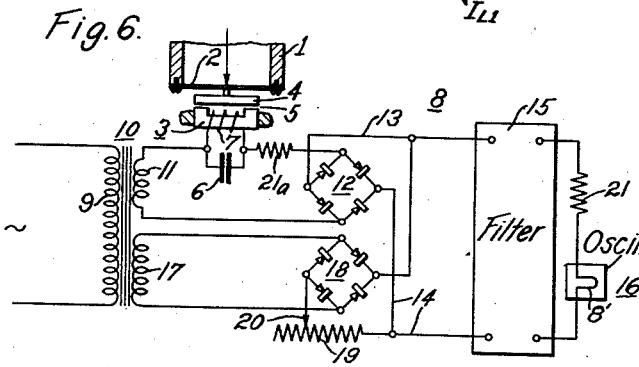

Fig. 6 is a practical embodiment of the fundamental circuit of Fig. 1, and

Figure 7:
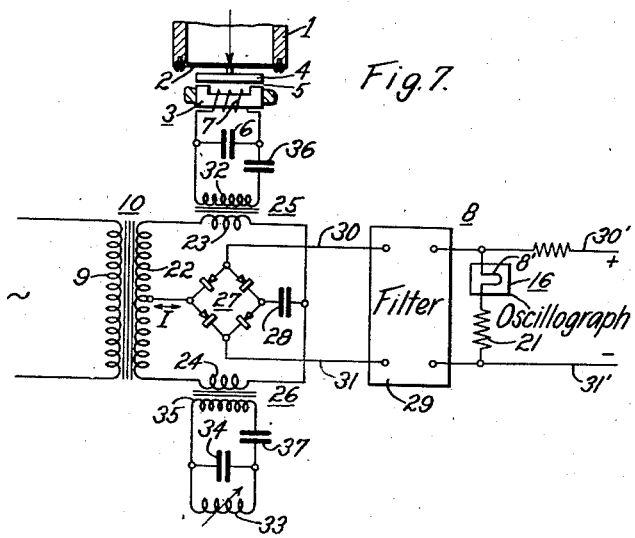

Fig. 7 diagrammatically illustrates a preferred form of a deflection measuring system embodying the principles of the present invention.

The basic principles of the present invention may best be understood by referring to the simple series circuit of Fig. 1. The specific arrangement shown is adapted to measure fluid pressures and comprises a chamber 1 having one end thereof sealed by a flexible diaphragm 2. This chamber is adapted to be fixed such that the open end thereof is in communication with a container (not shown), the fluid pressure in which is to be measured. Thus deflections of the diaphragm 2 will indicate the pressure within the container. An electromagnetic device or reactor generally indicated by numeral 3 has the armature element 4 thereof positioned to move in accordance with deflection of the diaphragm 2. Thus any change of applied pressure on the diaphragm will vary the length L of the airgaps 5 formed between the extremities of the core member of the reactor 3 and the armature.

As a step towards compensating for the non-linear response of the reactor 3, a capacitor 6 is arranged in parallel circuit relation with the coil element 7. The value of this capacitor is such that a leading power factor is obtained over the whole of the working range of airgaps 5 whereby resulting current values are produced as vectorially indicated in Fig. 2.

In Figs. 1 and 2, $I_L$ denotes the current flowing through the coil 7 of the reactor 3, $I_c$ is the current flowing through the capacitor 6, $E_x$ the voltage across the paralleled coil 7 and capacitor 6, I the current output of the parallel circuit and Z the overall impedance of a metering circuit 8 including any suitable metering or recording device.

Assuming a deflection of the diaphragm due to an increasing pressure and a corresponding decrease of the airgaps 5, an increase in the impedance of the coil 7 follows which limits the current $I_L$ flowing therethrough from some larger value $I_{L_1}$, on the vector diagram of Fig. 2 to some smaller value $I_{L_2}$. In view of the leading current $I_c$ of the capacitor 6, a variation in the current I is obtained from $I_1$ to $I_2$. Thus it will be noted that if $I_{L_1}$ and $I_{L_2}$ represent respectively the maximum and minimum currents through the coil 7 for the maximum and minimum airgaps, a current output of the paralleled circuit is obtained which leads the voltage $E_x$ and which increases in value with increasing fluid pressure. Thus it will be seen that the use of the overbalancing capacitor 6 causes a reversal of sign of the rate of change of I with respect to $I_2$ and hence with respect to the airgap change.

The change in the current I, however, is still non-linear with respect to the change in airgap. This may best be understood upon an inspection of Fig. 3 in which the susceptance $b$ of the circuit elements is plotted against the change in airgap $\Delta L$. Since, as previously noted, increasing pressures tend to close the airgaps 5, the length of the airgaps L will be decreased and may be expressed $\Delta L = L_0 - L$, where $L_0$ is the value of L at zero pressure. $\Delta L$ is, therefore, the amount by which the gap is decreased. The lagging susceptance $b_L$ of the reactor 3 is plotted below the abscissa and the leading susceptance $b_c$ of the capacitor 6 is plotted above the abscissa. The algebraic addition of these two curves since their effects are in opposition gives the plot $b_1$ and similar to the vector diagram of Fig. 2 indicates how the addition of the overbalancing capacitor 6 changes the over-all susceptance from one decreasing numerically to one increasing numerically with increasing $\Delta L$ which corresponds to a decreasing airgap. In other words, the current output of the paralleled coil and condenser combination will increase with decreasing susceptance of the coil. In each case, however, it will be noted that the decrease in flux leakage with a decreasing airgap increases the slope of the curves.

Figure 4 graphically illustrates the means for correcting this change in slope. Here the current I in the metering circuit is plotted against the total susceptance, $b_1$. Referring to Fig. 1, with a constant voltage E, a substantially linear relationship exists between the current, I, and the overall susceptance $b_1$, only if the impedance Z of the metering circuit 8 is negligible with respect to the overall impedance of the parallel circuit. Under such condition and neglecting the resistance of the parallel circuit the curve of Fig. 3 may substantially indicate the variation in output current I with changes in $\Delta L$. This linear relationship is indicated by the dotted line $Z=0$ in Fig. 4. Since the impedance relationship mentioned may not practically be obtained because Z is of some measurable value with respect to the overall impedance of the parallel circuit, the actual relationship of the current I, to susceptance $b_1$ is of the nature indicated by the solid curve, Z finite, for some predetermined value of Z. Thus, increasing the value of the impedance Z of the metering circuit 8 increases the departure from a linear relation between the current I and the susceptance $b_1$.

The effect upon the current I of the two sources of non-linearity, namely, the leakage flux of the reactor 3 and the impedance of the metering circuit 8 which normally are additive, are now made subtractive by means of the overbalancing capacitor 6. By proper adjustment of the impedance value Z it will now be seen that the non-linear effects may be canceled to produce a current I which will vary linearly with $\Delta L$ as shown in Fig. 5.

In practicing the present invention, various modifications of the fundamental circuit of Fig. 1 are, of course, obtainable. Fig. 6 illustrates a strain measuring system which is specifically adapted to indicate the instantaneous pressures developed within the arcing structure of an oil circuit breaker or the like. The primary 9 of a transformer 10 is connected to a suitable source of alternating potential. A secondary winding 11 of the transformer 10 has connected in series therewith the parallel circuit comprising the coil 7 of the reactor 3 and the capacitor 6. The output of this circuit as controlled by movements of the armature 4 is supplied to a bridge rectifier 12 and thence through conductors 13 and 14 to a suitable filter 15. The rectifier and filter are necessary to provide the desired continuous current to the current responsive element 8' comprising the detecting element of an oscillograph generally indicated at 16. Another secondary winding 17 of the transformer 10 supplies a second bridge rectifier 18, the rectified current output of which is limited by an adjustable resistor or potentiometer 19 and supplied to the conductors 13 and 14 in opposition to the rectified current output of the bridge rectifier 12. The purpose of this second circuit is three-fold. Since its current is in opposition to that in the circuit including the paralleled coil 7 and condenser 6, it makes possible the adjustment to zero by means of the resistor slider 20, of the current supplied to the oscillograph element 8' while there is still an arbitrarily determined current flowing in the main circuit branches. Thus the response line of Figure 5 can be changed to the dotted line through the origin, which dotted line shows not only a linear relation but also a linearly proportional relation between the output current I and the airgap change $\Delta L$. In addition to providing zero indication of the oscillograph for zero pressure, this permits a higher base current to be used through the reactor 3, thus giving more available current for the oscillograph for the same proportional change in reactor current. It finally tends to improve the linearity of the calibration curve near zero pressure by avoiding operation of the bridge rectifiers near zero current where their apparent resistance becomes very high. Should the impedance of the metering circuit 8 including the current responsive element 8' of the oscillograph 16 and its associated filter 15 be insufficient to produce a linear current as previously explained in connection with Fig. 1, a resistor 21 of suitable value may be connected in series circuit relation therewith to produce an over-all impedance Z of the necessary amount. In addition it may be desirable in such a circuit to provide a portion of the total impedance Z in series on the A. C. side of the rectifier 12 as indicated at 21a.

The preferred embodiment of the present invention is illustrated in Fig. 7. In this application, the secondary winding 22 of the transformer 10 is center-tapped and each half thereof comprises one leg of a bridge circuit. The other two legs of the bridge circuit are formed by the primary windings 23 and 24 of the isolation transformers 25 and 26. The output terminals of the bridge circuit thus formed have connected thereacross the input terminals of a bridge rectifier 27 and a capacitor 28 in series therewith. The output terminals of the bridge rectifier supply a suitable filter 29 through conductors 30 and 31 and the filtered output is conducted through the current responsive element 8' of the oscillograph 16. In the present instance, both resistor 21 and capacitor 28 are provided in effective series circuit relation with the filter 29 and the oscillograph element 8' to produce the over-all impedance Z of the current measuring circuit 8 which is necessary to obtain the previously explained linear current. Further refinement in linearity of response can be obtained by suitably proportioning the resistive and capacitive components of Z. A moderate D. C. bias is still provided from a separate source, such as a battery, by means of conductors 30' and 31', to eliminate near zero current non-linearity due to variable resistance of the bridge rectifier 27 and to imperfect matching of the bridge circuit elements. Adjustments for zero overall output for zero measured pressure can be made by adjusting this bias as well as by adjusting the bridge circuit reactor 33 to be mentioned below.

The isolation transformers are used primarily for convenience and serve to isolate the circuit, make possible more convenient capacitance values and to minimize the effect of line drop in the line connecting the pressure-responsive reactor 3 to the other components of the parallel circuit. The paralleled coil 7 of the reactor 3 and the capacitor 6 are supplied by the secondary winding 32 of the transformer 25, and a similar circuit comprising a variable inductance coil 33 shunted by a capacitor 34 is supplied by the secondary winding 35 of the transformer 26. The series condensers 36 and 37 appearing on the secondary sides of the coupling transformers 25 and 26 have been provided to cancel the leakage reactance of the transformers, thus keeping their effective voltage ratio practically equal to their turn ratio. Balancing of the bridge circuit is accomplished by properly adjusting the variable inductor 33 until the unbalanced current I flowing from the output terminals of the bridge circuit is zero. In view of the direct current bias which opposes flow of the current I, a normal higher circulating current may be maintained in the bridge circuit. This, of course, results in a proportionally greater output current I when an unbalance of the bridge circuit occurs. The range of current values of I flowing through the rectifier 27 may therefore be kept on the more flat portion of the characteristic curve of the rectifier with a resulting substantially linear rectified current output. The bridge circuit is unbalanced by a reduction in the airgaps 5 in accordance with increasing pressures which causes an increase of impedance of the parallel circuit and a corresponding change in the loading of the transformer 25. An unbalanced flow of leading current I increasing non-linearly with the impedance change, will, therefore, flow through the bridge rectifier 27 the condenser 28, and filter 29 and which due to the effect of the over-all impedance of the metering circuit 8 including the current responsive element 8' the condenser 28, the filter 29 and the resistor 21, will be caused to vary in a linear manner with the impedance change of the coil 7 to produce a graphic indication by means of the oscillograph generally indicated at 16 which is accurately indicative of the instantaneous pressure in a linearly proportioned manner.

The foregoing disclosure and the showings made in the drawing are merely illustrative of the principles of this invention and are not to be considered in a limiting sense. The only limitations are to be determined from the scope of the appended claims.

I claim as my invention:

1. A system for indicating the deflections of a member subject to a stress comprising, in combination, a variable reactor variable in response to deflections of said member, said reactor having a lagging current output which varies in a non-linear manner with deflections of said member, means in circuit relation with said reactor for producing a circuit characteristic whereby a leading non-linear current is obtained, means for correcting said non-linearity whereby a leading current varying linearly with deflections of said member is obtained and means for measuring said current whereby the deflections of said member are indicated.

2. A system for indicating the deflections of a member subject to a stress comprising, in combination, a reactor including a coil the inductance of which is variable in response to deflections of said member, said coil having a lagging current output which varies in a non-linear manner with deflections of said member, means shunting said coil for producing a circuit characteristic such that a leading non-linear current is obtained, means for correcting said non-linearity whereby a leading current varying linearly with deflections of said member is obtained and means for measuring said current whereby the deflections of said member are indicated.

3. A system for indicating the deflections of a member subject to a stress comprising, in combination, a reactor including a coil the inductance of which is variable in response to deflections of said member, said coil having a lagging current output which varies in a non-linear manner with deflections of said member, a capacitor arranged in shunt circuit relation with said coil adapted to change said lagging non-linear current to a leading non-linear current, means for correcting said non-linearity whereby a leading current varying linearly with deflections of said member is obtained and means for measuring said current whereby the deflections of said member are indicated.

4. A system for indicating the deflections of a member subject to a stress comprising, in combination, a reactor including a coil in the inductance of which is variable in response to deflections of said member, said coil having a lagging current output which varies in a non-linear manner with deflections of said member, a capacitor arranged in parallel circuit relation with said coil having a value of capacitive susceptance in excess of the maximum attainable inductive susceptance of said coil whereby a leading current is obtained which varies non-linearly with deflections of said member, means for correcting said non-linearity, whereby a leading current varying linearly with deflections of said member is obtained and means for measuring the current whereby the deflections of said member are indicated.

5. A system for indicating the deflections of a member subject to a stress comprising, in combination, a reactor having a coil inductively variable in response to deflections of said member, said coil having a lagging current output which varies non-linearly with deflections of said member, a capacitor arranged in parallel circuit relation with said coil having a value of capacitive susceptance in excess of the maximum attainable inductive susceptance of said coil whereby a leading current is obtained which varies non-linearly with deflections of said member, an additional impedance device in circuit relation with said coil of such characteristic as to have an opposite non-linear effect on said current of such amount that said current varies linearly with deflections of said member and means for measuring the current whereby the deflections of said member are indicated.

6. In a system employing but a single reactor including a coil for detecting the deflections of a member subject to a stress and having a lagging non-linear current output with respect to deflections of said member, means for correcting the non-linearity of said current comprising, in combination, means in circuit relation with said coil for providing a circuit characteristic whereby a leading non-linear current is obtained, and means in circuit relation with said coil of such character as to cause said current to vary linearly with deflections of said member.

7. Apparatus of the character set forth in claim 6 in which said means for providing a circuit characteristic whereby a leading non-linear current is obtained is a capacitor disposed in parallel circuit relation with said coil.

8. Apparatus of the character set forth in claim 6 in which said last mentioned means comprises a circuit for measuring said current.

9. A system for measuring the deflections of a member subject to a stress comprising, in combination, a reactor including a coil the inductance of which is variable in response to deflections of said member, a source of alternating potential for energizing said coil, said coil having a lagging current output which varies non-linearly with deflections of said member, means in parallel circuit relation with said coil for providing a circuit characteristic such that a leading non-linear current is obtained, circuit means including a full-wave rectifier for measuring said current, said circuit means having a suitable value of impedance to correct the non-linearity of said leading current, and biasing means for supplying a direct current bias to the output of said rectifier thus fixing the minimum value of current therein whereby near-zero current non-linear characteristics of said rectifier are eliminated.

10. A system for measuring the deflections of a member subject to a stress comprising, in combination, a variable reactor including a coil, said reactor being variable in response to deflections of said member, a source of alternating potential for energizing said coil, said coil having a lagging current output which varies non-linearly with deflections of said member, means in parallel circuit relation with said coil for providing a circuit having a leading power factor whereby a leading non-linear current is obtained, and circuit means having a predetermined value of impedance for correcting the non-linearity of said current comprising a full-wave rectifier, a filter for filtering the output of said rectifier and a current measuring instrument supplied by said filter.

11. Apparatus of the character set forth in claim 10 and in addition circuit means whereby a direct current bias is applied to the output of said rectifier for fixing the minimum value of current in said rectifier and eliminating the near-zero-current non-linear characteristics thereof.

12. A system for indicating the deflections of a member subject to a stress comprising, in combination, a bridge circuit, a source of alternating potential for energizing said bridge circuit, a reactor including a coil the inductance of which is variable in response to deflections of said member associated with one leg of said bridge circuit, said coil having a lagging current output which varies non-linearly with deflections of said member, means in parallel circuit relation with said coil for introducing a circuit characteristic whereby a leading non-linear current is obtained, a second coil having an adjustable inductance and a lagging current output associated with the leg of said bridge circuit adjacent that associated with the coil of said reactor, means in parallel circuit relation with said second coil for introducing a circuit characteristic whereby a leading current output is obtained, said second mentioned coil being adapted to substantially balance said bridge circuit for zero deflection of said member, and current measuring means associated with the output of said bridge circuit having an impedance characteristic such that the non-linear characteristic of the current output of said reactor coil is corrected.

13. A system for indicating the deflections of a member subject to a stress comprising, in combination, a bridge circuit, a source of alternating potential for energizing said bridge circuit, a reactor including a coil the inductance of which is variable in response to deflections of said member associated with one leg of said bridge circuit, said coil having a lagging current output which varies non-linearly with deflections of said member, means in parallel circuit relation with said coal for producing a circuit characteristic such that a leading non-linear current is obtained, a second coil having an adjustable inductance and a lagging current output associated with the leg of said bridge circuit adjacent that associated with the coil of said reactor, means in parallel circuit relation with said second coil for producing a circuit characteristic such that a leading current output is obtained, said second coil being adapted to substantially balance said bridge circuit for zero deflection of said member, and circuit means having a predetermined value of impedance for correcting the non-linearity of said current output of said first mentioned coil comprising a full-wave rectifier supplied by the unbalanced current of said bridge circuit, a filter for filtering the output of said rectifier and a current measuring instrument supplied by said filter.

14. A system for indicating the deflections of a member subject to a stress comprising, in combination, a bridge circuit, a source of alternating potential for energizing said bridge circuit, a reactor including a coil the inductance of which is variable in response to deflections of said member associated with one leg of said bridge circuit, said coil having a lagging current output which varies non-linearly with deflections of said member, means in parallel circuit relation with said coil for producing a circuit having a leading power factor whereby a leading non-linear current is obtained, a second coil having an adjustable inductance and a lagging current output associated with the leg of said bridge circuit adjacent that associated with the coil of said reactor, means in parallel circuit relation with said second coil for producing a circuit having a leading power factor whereby a leading current output is obtained, said second coil being adapted to substantially balance said bridge circuit for zero deflection of said member, and circuit means having a predetermined value of impedance for correcting the non-linearity of said current output of said first mentioned coil comprising a full-wave rectifier, with a series capacitor supplied by the unbalanced current of said bridge circuit, a filter for filtering the output of said rectifier and a current measuring instrument supplied by said filter.

15. Apparatus of the character set forth in claim 13 and in addition circuit means whereby a direct current bias is applied to the output of said rectifier for fixing the minimum value of current in said rectifier and eliminating the near zero current non-linear current characteristic.

THOMAS E. BROWNE, JR.